(12) United States Patent
Forbes (10) Patent No.: US 11,717,116 B2
(45) Date of Patent: Aug. 8, 2023

(54) COOKING METHOD AND APPARATUS

(71) Applicant: Ludlow D. Forbes, Elizabeth, NJ (US)

(72) Inventor: Ludlow D. Forbes, Elizabeth, NJ (US)

( * ) Notice: Subject to any disclaimer, the term of this patent is extended or adjusted under 35 U.S.C. 154(b) by 31 days.

(21) Appl. No.: 17/378,237

(22) Filed: Jul. 16, 2021

(65) Prior Publication Data
US 2023/0016665 A1    Jan. 19, 2023

(51) Int. Cl.
| | |
|---|---|
| *A22C 17/00* | (2006.01) |
| *A47J 43/16* | (2006.01) |
| *B08B 5/02* | (2006.01) |
| *B08B 5/04* | (2006.01) |
| *A47J 44/00* | (2006.01) |
| *A47J 37/04* | (2006.01) |
| *A47J 37/06* | (2006.01) |
| *A23L 3/365* | (2006.01) |
| *A23L 5/10* | (2016.01) |
| *A23L 2/02* | (2006.01) |
| *A47J 31/00* | (2006.01) |
| *A23L 13/72* | (2023.01) |
| *F25D 31/00* | (2006.01) |

(52) U.S. Cl.
CPC ........... *A47J 44/00* (2013.01); *A22C 17/0053* (2013.01); *A23L 2/02* (2013.01); *A23L 3/365* (2013.01); *A23L 5/15* (2016.08); *A23L 5/17* (2016.08); *A23L 13/72* (2016.08); *A47J 31/00* (2013.01); *A47J 37/041* (2013.01); *A47J 37/0641* (2013.01); *A47J 43/16* (2013.01); *B08B 5/02* (2013.01); *B08B 5/04* (2013.01); *F25D 31/005* (2013.01)

(58) Field of Classification Search
CPC .......... A47J 44/00; A47J 31/00; A47J 37/041; A47J 37/0641; A47J 43/16; A23L 13/72; A23L 5/17; A23L 5/15; A23L 2/02; A23L 3/365; A22C 17/0053; B08B 5/02; B08B 5/04
USPC .......................................................... 99/494
See application file for complete search history.

(56) References Cited

U.S. PATENT DOCUMENTS

| | | | | |
|---|---|---|---|---|
| 2,588,046 | A * | 3/1952 | Ridgely ................ | A47J 37/041 126/299 C |
| 3,016,817 | A * | 1/1962 | Persinger .............. | A47J 37/041 99/421 H |
| 3,441,980 | A * | 5/1969 | Defenbaugh .......... | A22C 9/001 99/532 |
| 3,980,010 | A * | 9/1976 | Collinucci .............. | A47J 37/00 99/421 H |

(Continued)

*Primary Examiner* — Eric S Stapleton
(74) *Attorney, Agent, or Firm* — Walter J. Tencza, Jr.

(57) ABSTRACT

An apparatus including a housing; a plurality of prongs connected to the housing so that the prongs are movable with respect to the housing; and a device for holding a food; and wherein the plurality of prongs are configured to be moved from a position outside of the food to a position where the plurality of prongs are inserted into the food; and wherein the plurality of prongs are configured to insert a substance into the food. The substance may be a seasoning. The apparatus may include a device for cleaning the plurality of prongs through a vacuum process and/or a blower process; wherein the device has an input configured to connect to one of the plurality of prongs. The apparatus may include a cook food platform; a sandwich platform; a hot beverage platform; and a cold beverage platform.

19 Claims, 8 Drawing Sheets

(56) References Cited

U.S. PATENT DOCUMENTS

| | | | | |
|---|---|---|---|---|
| 4,016,297 A * | 4/1977 | Theimer | | B65D 81/3476 426/89 |
| 4,016,301 A * | 4/1977 | Theimer | | H05B 3/06 426/573 |
| 4,100,302 A * | 7/1978 | Theimer | | A23L 5/15 426/107 |
| 4,178,660 A * | 12/1979 | Olney | | A22C 17/0053 99/532 |
| 4,204,467 A * | 5/1980 | Peters | | A23N 4/04 99/557 |
| 4,250,959 A * | 2/1981 | Spasojevic | | A47J 39/006 126/379.1 |
| 4,366,177 A * | 12/1982 | Wells | | A21B 1/48 426/243 |
| 5,006,355 A * | 4/1991 | Stuck | | A23L 5/15 426/243 |
| 5,012,726 A * | 5/1991 | Fehr | | A21C 11/16 99/450.6 |
| 5,206,045 A * | 4/1993 | Stuck | | A47J 37/044 426/243 |
| 5,855,671 A * | 1/1999 | Scherping | | A01J 25/008 99/452 |
| 5,953,983 A * | 9/1999 | McCormick | | A01J 25/008 99/465 |
| 7,487,716 B2 * | 2/2009 | Swank | | A21B 3/02 219/400 |
| 7,703,411 B1 * | 4/2010 | Bakos | | A23P 20/12 118/24 |
| 7,707,931 B2 * | 5/2010 | Garrett | | B65B 5/00 99/534 |
| 2001/0009128 A1 * | 7/2001 | Backus | | A47J 37/0641 99/421 H |
| 2003/0047087 A1 * | 3/2003 | Phebus | | A23B 4/12 99/516 |
| 2004/0069155 A1 * | 4/2004 | Shei | | F24C 7/087 99/448 |
| 2005/0022676 A1 * | 2/2005 | Swank | | F24C 15/02 99/419 |
| 2005/0081722 A1 * | 4/2005 | Gucciardi | | A23P 20/12 99/494 |
| 2007/0102418 A1 * | 5/2007 | Swank | | A21B 3/02 219/400 |
| 2009/0241784 A1 * | 10/2009 | Colby | | A47J 37/041 99/421 A |
| 2010/0178398 A1 * | 7/2010 | Wai | | A23L 13/70 426/281 |
| 2011/0083567 A1 * | 4/2011 | Kramer | | A47J 43/04 99/532 |
| 2012/0185086 A1 * | 7/2012 | Khatchadourian | | G07F 11/70 99/345 |
| 2012/0308702 A1 * | 12/2012 | Khatchadourian | | G07F 17/0078 426/523 |
| 2013/0011535 A1 * | 1/2013 | Mafi | | A47J 37/0786 99/473 |
| 2013/0125767 A1 * | 5/2013 | Shoshan | | A21D 8/06 99/441 |
| 2013/0302490 A1 * | 11/2013 | James | | A23B 7/0053 426/443 |
| 2014/0216271 A1 * | 8/2014 | Arling | | A47J 37/041 99/421 H |
| 2016/0220057 A1 * | 8/2016 | Smith | | H05B 3/0076 |
| 2016/0379434 A1 * | 12/2016 | Huang | | G07F 17/0078 99/334 |
| 2018/0249861 A1 * | 9/2018 | Hiatt | | A47J 36/00 |
| 2020/0053842 A1 * | 2/2020 | Jeon | | H05B 6/6473 |

* cited by examiner

COOKING METHOD AND APPARATUS

FIELD OF THE INVENTION

This invention relates to devices for cooking.

BACKGROUND OF THE INVENTION

There are various known devices related to cooking.

SUMMARY OF THE INVENTION

In at least one embodiment of the present invention, an apparatus is provided comprising: a housing; a plurality of prongs connected to the housing so that the prongs are movable with respect to the housing; and a device for holding a food; and wherein the plurality of prongs are configured to be moved from a position outside of the food to a position where the plurality of prongs are inserted into the food; and wherein the plurality of prongs are configured to insert a substance into the food.

In at least one embodiment, the substance is a seasoning. In at least one embodiment of the present invention, the apparatus includes a device for cleaning the plurality of prongs through a vacuum process; and wherein the device has an input configured to connect to one of the plurality of prongs.

In at least one embodiment of the present invention the apparatus includes a device for cleaning the plurality of prongs through a blower process; and wherein the device has an input configured to connect to one of the plurality of prongs.

In at least one embodiment, the apparatus includes a cook food platform; a sandwich platform; a hot beverage platform; and a cold beverage platform.

The cook food platform may be connected to a cooking chamber, a refrigerator chamber, a room temperature chamber, a thawing and marinating chamber, and a freezer chamber. The sandwich platform may be connected to a cold cuts chamber, a patties chamber, and a baking chamber. The hot beverage platform may be connected to a cappuccino chamber, a tea bags chamber, an espresso chamber, and a sugar and creamer chamber. The cold beverage platform may be connected to an apple juice tank, a large soda bottles chamber, an orange juice container, and a grape juice container.

In at least one embodiment, a fence is provided which holds a piece of bread in place while a sandwich is automatically prepared.

In at least one embodiment, a method is provided which may include automatically preparing an item for human consumption by using an apparatus comprising a cook food platform; a sandwich platform; a hot beverage platform; and a cold beverage platform.

The item for human consumption may be, for example, a cooked food, a sandwich, a hot beverage, a cold beverage.

DETAILED DESCRIPTION OF THE DRAWINGS

Figure 1:
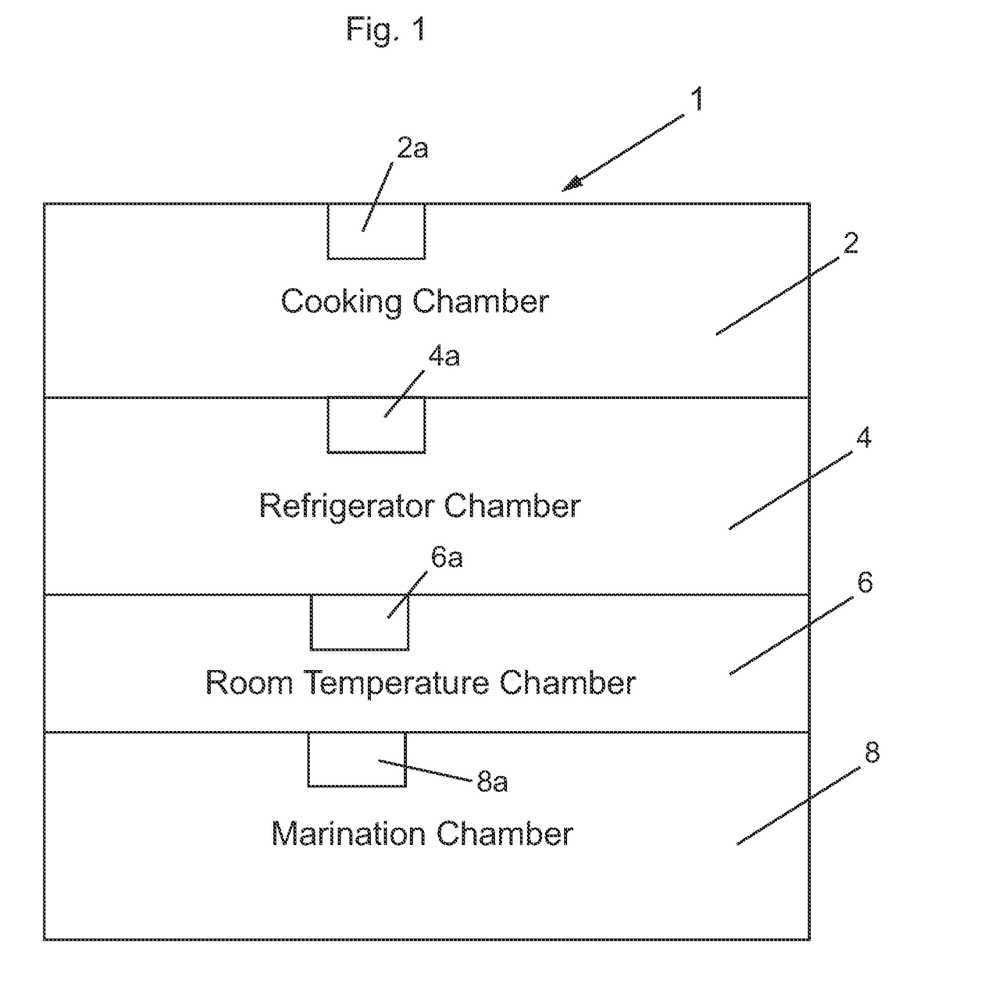
FIG. 1 shows a simplified block diagram of an apparatus in accordance with an embodiment of the present invention.

FIG. 1 shows a simplified block diagram of an apparatus 1 in accordance with an embodiment of the present invention.

The apparatus 1 includes a cooking chamber 2, a refrigerator chamber 4, a room temperature chamber 6, and a marination chamber 8. In at least one embodiment, for commercial restaurants, the apparatus 1 may include the chambers 2, 4, 6, and 8.

The cooking chamber or device 2 includes a selection control panel or device 2a, which may include a computer processor, a computer memory, a computer interactive device such as a computer keyboard, computer touch screen, and/or computer mouse.

The cooking chamber or device 4 includes a selection control panel or device 4a, which may include a computer processor, a computer memory, a computer interactive device such as a computer keyboard, computer touch screen, and/or computer mouse.

The cooking chamber or device 6 includes a selection control panel or device 6a, which may include a computer processor, a computer memory, a computer interactive device such as a computer keyboard, computer touch screen, and/or computer mouse.

The cooking chamber or device 8 includes a selection control panel or device 8a, which may include a computer processor, a computer memory, a computer interactive device such as a computer keyboard, computer touch screen, and/or computer mouse.

Figure 2:
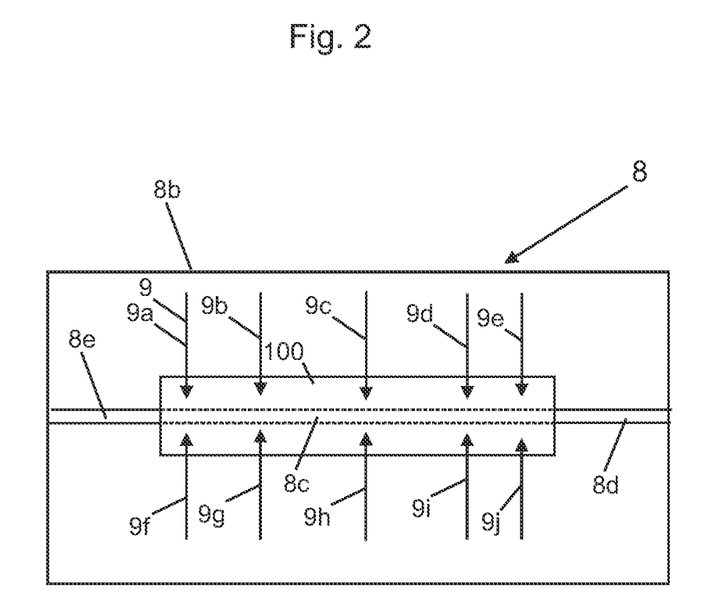
FIG. 2 shows a simplified diagram of a marination chamber for use with the apparatus of FIG. 1.

FIG. 2 shows a simplified diagram of the marination chamber 8 for use with the apparatus 1 of FIG. 1.

The marination chamber 8 includes outer peripheral wall 8b, and a rod which is the combination or members 8e, 8c, and 8d. The member 8c is shown going through a slab or piece of meat 100. The combination of members 8e, 8c, and 8d rotates to cook the meat 100 in rotisserie rotating manner.

The outer peripheral wall 8b may be embedded with heat sources, such as heat coils super hot air fryer or cyclonic air cooker or turbo heat cooker for cooking the meat 100.

In at least one embodiment, food may be marinated in the marination chamber 8, and then transferred to the room temperature chamber 6, for a pre-programed period of time, and then transferred into the refrigerator chamber 4 for a pre-programed period of time, and then transferred to the cooking chamber 2.

FIG. 1 may be viewed as a floor plan, and the apparatus 1 may include conveying or ejecting devices for ejecting food from chamber 8 to chamber 6, from chamber 6 to chamber 4 and then from chamber 4 to chamber 2.

In the marination chamber 8 may be provided injection devices 9, such as devices 9a, 9b, 9c, 9d, 9e, 9f, 9g, 9h, 9i, and 9j, for injecting flavoring of seasoning into a slab or piece of meat 100. The ejecting devices which may be part of the apparatus 1, for conveying or ejecting between chambers, are typically configured for heavy usage and precision function.

In at least one embodiment, seasoning, such as Jamaican Jerk seasoning may be employed in the marinating seasoning process in the marination unit or chamber 8.

The chambers 2, 4, 6, and 8 are configured, in at least one embodiment so that each can perform its own tasks at the same time as another chamber. For example, marination chamber 8 may marinate a slab or piece of meat 100, while second piece of meat or food, sits in room temperature chamber 6, a third piece of meat or food sits in refrigerator chamber 4, and a fourth piece of meat or food sits in cooking chamber 2.

The marination chamber 8 may include manual and electric devices for injection of raw meats like hamburger patties, regular beef, ground turkey meat, ground chicken meat, or ground pork meat. The tubes or devices 9a-9j may be manual or electric devices for injection of seasonings into raw meat.

The injection devices 9a-9j may inject flavoring or seasoning into many different foods, such as including but not limited to steaks, pork chops, rump roasts, whole chickens, chicken parts, chicken breast, chicken thighs, chicken legs, whole turkey, turkey parts, turkey breasts, turkey legs, and turkey wings.

The injection devices 9a-9j may includes tubes for injection which may be have therein or may be provided with seasonings like ground or blended like onion, scallions, green peppers, garlic, celery, red peppers, rosemary, and thyme; and/or spices such as oregano, black peppers, red pepper flakes, white hot peppers; and/or sauces such as worcestershire sauce, soy sauce, teriyaki marinade, and steak sauce.

One or more seasonings, spices and/or sauces may be blended together to create a combination marinated seasoning for food, which can be injected into raw meats, or other foods.

In at least one embodiment, blended gourmet seasonings, spices or sauces may be marketed in tube like apparatuses for use as part of injection devices 9a-9j, that are sold in three sizes such as in heights of three, six, and nine inches.

Each of these tubes of gourmet seasoning, spices, and sauces may also be a specific seasoning, sauce or spice such as, for example, only onions, only green peppers, or only garlic with spices and sauces.

In at least one embodiment, the tubes of seasoning, spices or sauces may come with a first dispensing head for injection use (for injecting into meat 100 on rotisserie rod 8c-e), and with a second dispensing head which does not have injection capability.

Each of these for tubes for none injection devices 9a-9j may have grooved heads which allow the user to simply pour or squeeze out manually these tubes' gourmet seasonings, spices and/or sauces on their raw meats to marinate before cooking.

In at least one embodiment, the marinating process can now be easily and automatically accomplished within these injection devices 9a-9j with their respective tubes, with seasonings, sauces, or spices, attached in the marination chamber 8, to inject a user's specific choice of gourmet seasoning into their raw meats.

In at least one embodiment, for example, a food, such as a raw steak, may be ejected using a ejecting device, such as with a ejecting device, from the refrigerator chamber 4 to the room temperature chamber 6, so the meat can thaw out. The raw steak after thawing out, may be marinated in the marination chamber 8, such as by injection using devices 9a-j.

After a specific marinating time for that type of meat, the apparatus 1 would automatically eject the marinated food from the marination chamber 8 into a cooking chamber 2 which may employ a convection oven, ultra hot air fryer, or turbo heat convection oven, for example to cook the food.

Figure 5:
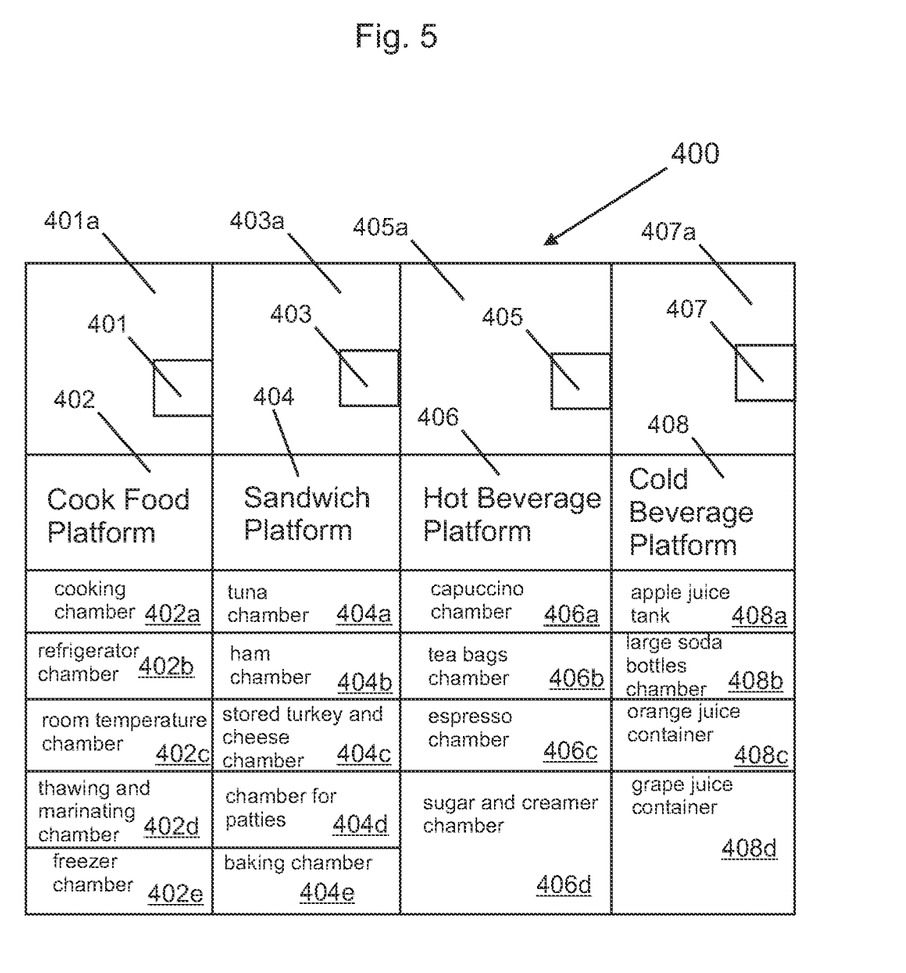
FIG. 5 shows a simplified diagram of a food cooking, sandwich making, hot and cold beverage dispensing apparatus in accordance with an embodiment of the present invention.

The apparatus 1 of FIG. 1 and/or the apparatus 400 of FIG. 5 are configured to create an entire meal. In at least one embodiment, the cooking chamber 2 in FIG. 1 and FIG. 5 chamber below FIG. 402 FIG. 1 chamber 2 cannot be next to the marinating or marination chamber 8. However, the apparatus 1 and/or one or more of chambers 2, 4, 6, and 8 can be pre-programed such as through a computer program stored in computer memory, implemented by a computer processor of the apparatus 1, to cause mechanical injecting apparatus and/or devices of apparatus 1 to make food eject food to the cooking chamber 2 after the food marinating or marination chamber 8. In at least one embodiment, the apparatus 1 may be programmed to have raw food spend some preprogrammed amount of time in room temperature chamber 6 where the seasoning can soak into the raw meat after the marination chamber 8.

The marination chamber 8 may also provide self brushed basting where meats, such as meat 100 are automatically basted in over or with cooking chambers employing these gourmet seasoning tubes.

In at least one embodiment of the present application, in the fast food industry, gourmet seasoning, spices, and/or sauces tubes for devices 9a-9j may be provided in which hamburger patties are injected and seasoning penetrates and inject seasoning into each patty.

Figure 3:
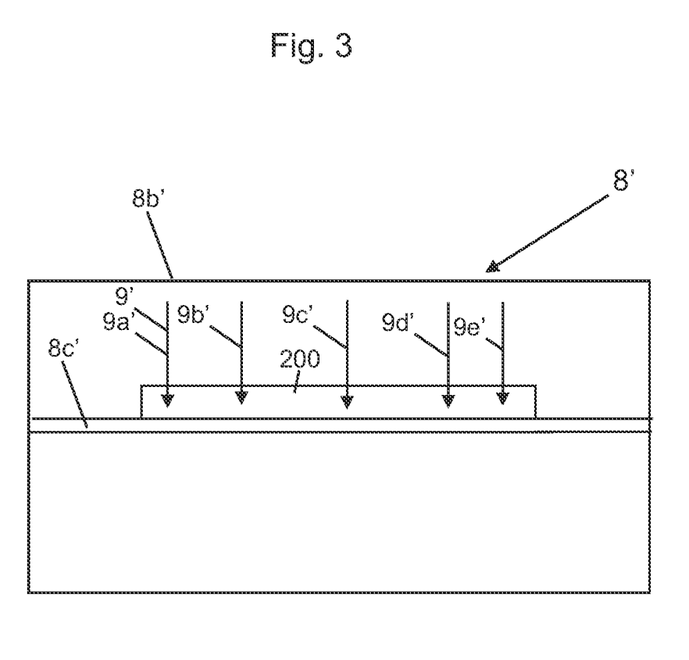
FIG. 3 shows a simplified diagram of another marination chamber for use with the apparatus of FIG. 1.
Figure 4:
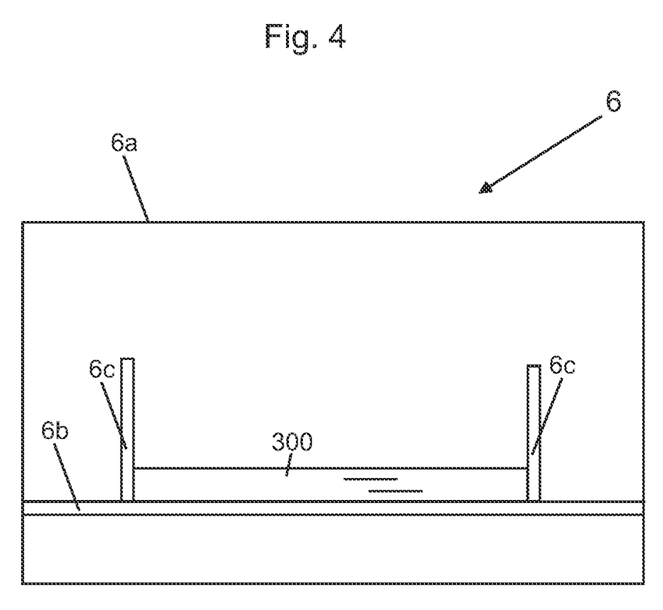
FIG. 4 shows a simplified diagram of a room temperature chamber with a fence for inserting a bottom piece of bread and then the rest of a sandwich.

FIG. 3 shows a simplified diagram of marination chamber 8', in another embodiment of the present invention, for use with the apparatus 1 of FIG. 1.

In FIG. 3, a hamburger patty 200 sits on a shelf or plate 8c', and a plurality of injection devices 9', including injection devices 9a', 9b', 9c', 9d', and 9e' are used to inject the patty 200 with seasonings, flavorings, and/or sauces. The chamber 8' includes a wall 8b'.

The marination compartments 8 or 8' may include a computer processor controlled by computer programming stored in computer memory, and may cause a conveying device to eject to the refrigeration chamber 4, and thereafter may be put on a grill for cooking and/or may be supplied to cooking chamber 2.

Each of the compartments 2, 4, 6, and 8 may be configured to have a computer processor which is controlled by computer programming stored in computer memory to transfer and open hard plastics food adder containers and deposit the content into one or more of the chambers 2, 4, 6, and 8.

Foods, including meats, chicken, turkey, lamb, vegetables, broccoli, cabbage, carrots, brown rice, mac and cheese, french fries, bake potatoes, mash potatoes, may be placed and/or cooked within the appropriate chamber of chambers 2, 4, 6 and/8 of FIG. 1 of in the appropriate chamber of chambers 402a-402e below the cook food platform 402.

In at least one embodiment, below cooking platform 402, there is cooking chamber 402a a refrigerated chamber 402b a room temperature chamber 402c a thawing and marinating chamber 402d where foods like meats, vegetable and starch are taken from a frozen compartment in the case of meats to defrost and marinated with the injection process of seasoning.

The chamber 402a is the cooking chamber for cooking meats that seasoning has already soak into. Here these meats can be marinated and stored into freezer chamber 402e along with other foods for cooking with super hot air fryers, super cyclone convection ovens or heating coil and steamed apparatus to cook and steam vegetable.

Below sandwich platform 404, in at least one embodiment, there is an already seasoned and prepared tuna fish with mayo and other seasoning and bread ready to make a sandwich with lettuce, tomatoes, mayo, and cheese in chamber 404a Below that we have a sliced turkey ready to create a sandwich with cheeses like swiss or American or gouda cheese in a special refrigerated smaller compartment 404b to dispense between sandwich making section.

Then a hamburger making section 404c that holds precooked hamburger patties and rewarm them and make a sandwich with cheese, mayo, lettuce, tomato's with or without onions.

Bologna which can now be serve hot or cold. It should be noted that all sandwich compartment can be stocked with whatever cold cuts are desired. In at least one embodiment, an option for hot or cold sandwiches may be provided. Also multiple cheese, pre-sliced lettuce, and/or tomatoes may be stocked in pre packed sealed containers in a refrigerated chambers to preserve shelve life.

Hot Beverage platform 406 where coffee, cappuccino, hot chocolate, various tea bags flavors along with sweeteners or creams a family may desire. Here the hot water coil will provide hot water to create these beverages.

For cold beverages will simply have siphon hoses attach to containers of what ever juices and drinks a family prefer, like apple juice, Orange soda, grape soda, and other sodas may be stored in a refrigerated compartment, such as one of 408a, 408b, 408c, and/or 408d, all below cold beverage platform 408.

Food is configured to be automatically signaled to start cooking in chamber FIG. 2 and FIG. 5 below 402 and selection of which specific foods should be deposited into chambers by robotic arms for cooking from holding in refrigerator chamber FIG. 1 chamber 4 also FIG. 5 below chamber 402 (which may include a freezer) may be determined by a smart phone, and smart home electronics like Siri (trademarked), Alexa (trademarked), or Google (trademarked).

The apparatus 1 allows users to have food automatically cooked and finished at their time preference for breakfast, lunch, and dinner.

Compartment 403a may allow for the creation of any egg dish from scrambled eggs to an omelet The compartment 403a shown in FIG. 5 may include a refrigerator chamber for storage for regular eggs to be stored and then may be moved to cooking chamber, such as 401a by robotic arm to create hard boiled eggs.

A cooking chamber in FIG. 5, such as one of 402a-d, below cook food platform 402 may create hot sandwiches, while a refrigerator chamber, such as one of 402a-d below 402 may create cold sandwiches.

In at least one embodiment, the room temperature chamber 6 includes a wall 6a, a platform or a plate 6b, and a fence or peripheral wall 6c, as shown in FIG. 5 below chamber 404. A bottom piece of bread 300 may be placed on the platform 404, inside the fence or peripheral wall 6c, which typically surrounds the entire piece of bread 300 so that the piece of bread 300 cannot move side to side.

The fence FIG. 5 below chamber 404 is configured to make a sandwich. The fence 6c may be about one half to two inches high where ingredients of these sandwiches would be deposited onto the piece of bread 300, within the perimeter of the fence 6c. For example, ham, cheese, tomatoes, lettuce, and mayo, and other food items may be placed on the bread 300 to form a sandwich. After the main bottom bread 300 is placed within the perimeter of the fence 6c and on the platform 6b, then other food items or spices are applied, such as mayo or mustard or whatever the user prefers, then ham and cheese, for example, would then be dispensed by the unit's system, then lettuce and tomato and mayo and mustard and the top bread of the sandwich is placed at the top.

The bread 300 or the top and bottom pieces of bread are configured to be easily toasted by the apparatus FIG. 5, below 404, such as through cooking chamber 2 or a toaster of the cooking chamber 2. The same or similar fence 6c function may be employed if the system is made of a hamburger, tuna, or turkey sandwich.

The hot beverage chamber FIG. 5 below 406 may also be configured to create hot beverages, while, such as hot chocolate, coffee, cappuccino, various teas while the refrigerator FIG. 5 below chamber 406 may be configured to create cold beverages. A hot water source may be provided to create hot beverages such as, for example, a heating coil, to heat water as it travels through coils.

Hot sandwiches like a hamburger, beef patties may be provided in a precooked stated and may only requiring simple heating by the cooking chamber in FIG. 1 compartment 2. The fence 6c can also be used to assembled a hamburger, by placing the bottom piece of bread, like bottom piece 300 in FIG. 5 below. 404, then a mayo spread, a patty meat, then pickles, lettuce, tomatoes, and cheese, and a top piece of bread smart phone, smart home electronic system like Siri (trademarked), Alexa (Trademarked) or Google (trademarked) is configured to be used in one or more embodiments of the present invention to control various devices which may be part of the chambers 2, 4, 6, and 8. Hot dogs and/or hot dog buns may be provided in a similar manner to hamburgers.

The apparatus 1 may be used for food dehydration, such as with jerky and fruits.

The injection devices 9a-9j for some food like beef, turkey, and chicken, or chicken patties possesses a flat head covered with holes for injection needles like apparatus to pass through and hold down these meat patties after the injection process.

The cooking chamber FIG. 1 compartment long with FIG. 5 below chamber 402 may include a drip off surface where fat and grease drips off into a removable container along with removable grill like surface whose food is cooked. In at least one embodiment, chambers 2, 4, 6, and 8 are configured to be easily cleaned. All chambers FIGS. 1, 2, 4, 6, and 8 Along with FIG. 5, chambers 402, 404, 406, 408 are configured to be easily cleaned with dishing washing detergent and water solution. To wipe all walls of compartments and/or chambers 2, 4, 6, and 8, after use, a rag may be rinsed out again with warm water the 2, 4, 6, and 8 may be wiped again with the rag.

In at least one embodiment of the present invention, a cleaning process for chambers 2, 4, 6, and 8 may be provided by injecting an individual hose and quills or prongs which may be provided as part of apparatus 1. The quills or prongs may be made of reinforced steel or titanium to prevent breaking.

A special flexible bendable hose, where holds a large number of quills or prangs provided, in at least one embodiment, to rap around a whole turkey, a whole chicken or a large roast to inject with seasoning.

In at least one embodiment, the user would detach an end of the injection hose from the rest of the apparatus 1 and the also detach the hose from the 3 to 6 to 9 inches seasoning tubes, such as seasoning tubes 9a-9j shown in FIG. 2. Each of the seasoning tubes may be elongated and may be three to nine inches in length. The seasoning tubes may be provided in increments of three, six, and nine inches.

In at least one embodiment, the prongs 9a-9j shown in FIG. 2, may be fixed to the inside of the wall 8b, and may configured to be screwed off to then soak in detergent and water solution, and then to be rinsed individually. The hose portion shown in FIG. 2 what diagram 9a thru 9j what number 9a-9j of the apparatus 1, in at least one embodiment, may then be attached to a kitchen sink water tap where water is run through the hose with dish washing detergent, and then just warm water a second time to complete a cleaning process.

The hose and quills and prongs 9a-9j are configured to be hung up to allow water to run out from the prongs 9a-9j. Another function of drying these hose mechanisms is to have a newly designed small air pressure apparatus, such as apparatus 600 shown in FIG. 7 that is configured to blow water and/or vacuum or suck water from these hoses, quills, or prongs 9a-9j. In at least one embodiment, the apparatus 600 may be an add on to the apparatus 1 of FIG. 1 or the apparatus 400 shown in FIG. 5.

In at least one embodiment, the quills, prongs, or tubes 9a-9j shown in FIG. 2 are configured to be sensitive to bones within raw meats and will stop penetrating when hitting a bone but other prongs and quills will still continue to penetrate these raw meats.

The cooking chamber 2 may include a warning system for when grill like cooking surfaces are not put back into place with a catch container. The warning system may be configured to stop cooking and flash a red light, indicating grill and/or catch container needs to be replaced back.

The apparatus 1 and FIG. 5 below chamber 402 of one or more embodiments of the present invention allows meats like whole turkey, chickens, steaks, lamb, and rump roast to now be injected with gourmet seasonings and to be placed into reusable containers that are sealed automatically and transferred into the freezer or refrigerator compartment 4 manually or automatically by the apparatus 1 that also may be coded where to find the reusable container when required to cook the food inside the container.

It is important to note that some of these injection devices, such as injection devices 9a-9j, in at least one embodiment, come with multiple chicken whole or large whole turkey, or different size and shapes of steaks, roasts.

In at least one embodiment, instead of injecting these turkey, chicken steaks, rump roasts with gourmet seasoning, consumers can purchase different single tubes of seasoning with one specific type of flavor seasoning or multiple seasoning flavor tubes with spices and sauce to simply rub on or mix into their meats for the marinating process.

One or more embodiments of the present invention allow meat patties to be injected with Jamaican Jerk seasoning, spices and sauces in them with holes to penetrate and permeate the burger patties during cooking creating a greater tasting burger. A disk 500 shown in FIG. 6, may be used for this purpose. One or more embodiments of the present invention are configured to provide a jerk turkey seasoned burger, a jerk chicken seasoned burger, and/or a jerk pork seasoned burger.

In at least one or more embodiments, all these different ground-up meat seasoning with new gourmet seasoning including our jerk seasoning, the present invention, in one or more embodiments creates a new type of burger; with a special and unique style and taste like never seen before.

For smaller burgers be they beef, turkey, chicken, pork we can now employ a smaller frozen disk made up of frozen blended seasoning spices and sauces and designed with multiply holes within these patties to permeate the patties during cooking for great taste. Or we can now create a meat patty with bigger frozen thick chunks of ground up seasoning with holds in the patty for people to experience a fuller taste of these seasoning during the eating of these new gourmet burger FIG. 5 shows a simplified diagram of a food cooking, sandwich making, hot and cold beverage dispensing apparatus 400 in accordance with an embodiment of the present invention. The apparatus 400 includes cook food platform 402, sandwich platform 404, hot beverage platform 406, and cold beverage platform 408.

The apparatus 400 includes a control selection panel or device 401 which may include a computer processor, computer interactive device such as a computer keyboard or touchscreen, and computer memory for controlling the cook food platform device 402. The apparatus 400 includes a compartment 401a, which may be at least partially transparent, and the control section panel 401 may be covering part of the outer glass of the compartment 401a.

The apparatus 400 also includes a control selection panel or device 403 which may include a computer processor, computer interactive device such as a computer keyboard or touchscreen, and computer memory for controlling the cook food platform device 404. The apparatus 400 includes a compartment 403a, which may be at least partially transparent, and the control section panel 403 may be covering part of the outer glass of the compartment 403a.

The apparatus 400 also includes a control selection panel or device 405 which may include a computer processor, computer interactive device such as a computer keyboard or touchscreen, and computer memory for controlling the cook food platform device 406. The apparatus 400 includes a compartment 405a, which may be at least partially transparent, and the control section panel 405 may be covering part of the outer glass of the compartment 405a.

The apparatus 400 also includes a control selection panel or device 407 which may include a computer processor, computer interactive device such as a computer keyboard or touchscreen, and computer memory for controlling the cook food platform device 4. The apparatus 400 includes a compartment 407a, which may be at least partially transparent, and the control section panel 407 may be covering part of the outer glass of the compartment 407a.

The apparatus 400 may also include a computer processor, a computer interactive device 401 such as a computer keyboard or touch board or touch screen and computer memory for controlling cooked food being ejected from the cooking chamber or platform 402 to a see through glass compartment such as room compartment 6 shown in FIG. 1.

The apparatus of 400 of FIG. 5, may include the cook food platform 402. There may be physically located a cooking chamber 402a, a refrigerator chamber 402b, a room temperature chamber 402c, a marinating and defrosting chamber 402d, and a frozen meat, starch and vegetable compartment holder 402e beneath and/or as part of the cook food platform 402.

The apparatus 400 of FIG. 5 may include the sandwich platform 404. There may be physically located a tuna chamber 404a, a ham chamber 404b, a stored turkey and cheese chamber 404c, a chamber for patties 404d, and a baking chamber 404e beneath and/or as part of the cook food platform 404.

The hot beverage platform 406 may include a hot water coil.

The apparatus 400 of FIG. 5 may include the hot beverage platform 406. There may be physically located a coffee and cappuccino chamber 406a, a tea bags chamber 406b, an expresso chamber 406c, and a sugar and creamer chamber 406d beneath and/or as part of the hot beverage platform 406.

The apparatus 400 of FIG. 5 may include the cold beverage platform 408. There may be physically located an apple juice tank 408a, a large soda bottles chamber 408b, an orange juice container 408c, and a grape juice container 408d beneath and/or as part of the cold beverage platform 408. Alternatively, or additionally, milk and/or milk containers may also be provided in one of chambers 408a-d.

The apparatus of FIG. 1, in at least one embodiment is for marinating and cooking.

The apparatus of FIG. 5 is a device which will allow marinating, cooking, refrigeration, and room temperature compartment, and also will allow for creating a sandwich, with hot and cold beverage dispensing units.

The apparatus 1 and 400 may have see through glass compartments or walls to compartments so that users can see the sandwich being made or the meal being provided. After food is cooked or a sandwich has been made, the apparatus 1 or 400 may eject the food up platform 402 up from cooking chamber below 402

In at least one embodiment, the cooking chamber 2 should not be next to the marination chamber 8 because after marinating, the meat must go to a room temperature chamber, such as room temperature chamber 6 for seasoning to soak into the meat.

It is preferred, in one or more embodiments, that all the compartments should be strongly and properly Insulated to prevent breaching from other compartments or chambers temperatures. For example, chambers 2, 4, 6, and 8 should have strongly and properly insulated wall with respect to adjacent compartments and with respect to the outside or ambient world.

Attach is the selection control panel for the multiple chambers margination, room temperature, refrigerated and cooking compartments.

In one or more embodiments of the present invention, the selection control panels or devices 2a, 4a, 6a, and/or 8a may be configured to be programmed in one or more computer memories of 2a, 4a, 6a, and/or 8a by time per compartments or type of raw meats that are being employed within the chambers or units 2, 4, 6, and 8, respectively, at the time.

For example, in one or more embodiments, users can simply select steak food on the control panels 2a, 4a, 6a, and 8a, and all compartments would now uniformly set a specific time for each compartment to function appropriately for a steak food.

In one or more embodiments, a user may set a time or times on the control panels or devices FIGS. 1 2a, 4a, 6a, and 8a, Along with FIG. 5 below chamber 402 and 404 based on the user's individual taste or ways they want food to cook in these units. For example, a time or times may be set for a well done steak, a medium steak, or a medium rare cooked steak, and with an appropriate set temperature or temperatures.

Each of the quills or prongs 9a-9j may include a sensor, which communicates with a computer processor of the apparatus 1, where if the quills or prongs 9a-9j hit bone in a raw meat, the computer processor of the apparatus, implementing a computer program stored in computer memory would be programmed to stop penetrating into the meat with that particular prong hit a bone, but the other injection processor would continue with other prongs of 9a-9j.

In at least one embodiment of the present invention, a meat may be marinated in a raw state in chamber 8, then held at room temperature in chamber 6 for a programmed time, as determined by a computer processor of apparatus 1 implementing a program in computer memory. The raw marinated meat may be refrigerated in chamber FIG. 1 4, and/or provided to cooking chamber 2 for cooking. In at least one embodiment this same function may occur in apparatus 400, for example below chamber 404.

Figure 6:
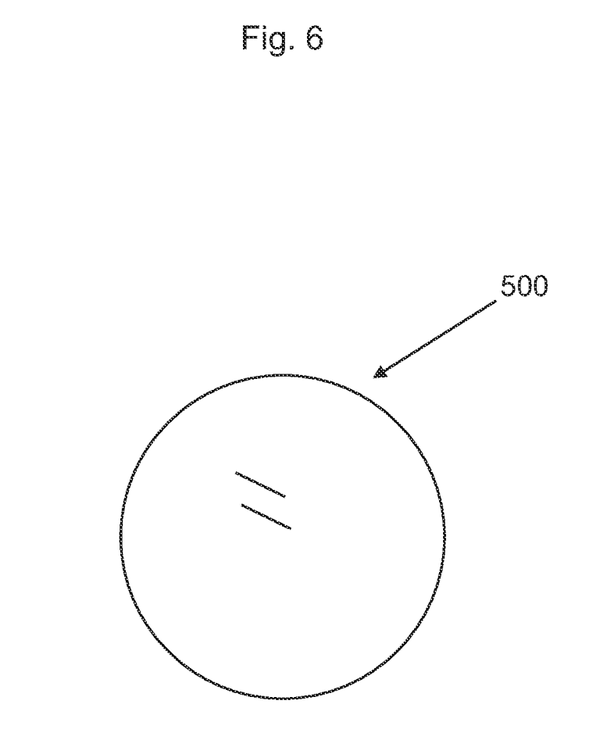
FIG. 6 shows a disk of flavoring or seasoning which can be placed between ground meat accordance with an embodiment of the present invention.

FIG. 6 shows a disk 500, that may be made of frozen seasoning. The disk 500 may be placed between ground beef for example, to dissolve during the cooking process. In at least one embodiment, a patty above will be perforated with holes. The seasoning from the disk 500 is inserted into the ground meat to create a better tasting burger.

Note, in FIG. 2, the prongs 9f-9j may be eliminated in one or more embodiments, and the food 100 may lie on a flat surface while prongs 9a-9e are used to insert seasoning.

Figure 7:
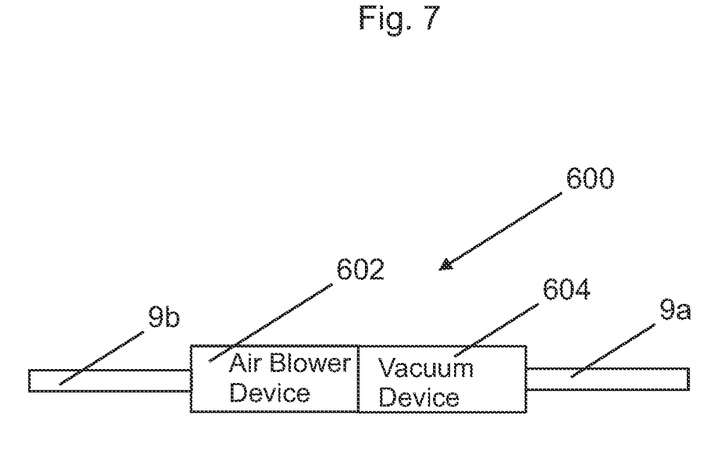
FIG. 7 shows a simplified diagram of an apparatus for cleaning one or more prongs shown in FIG. 2.

FIG. 7 shows an apparatus 600 including a vacuum device 604 and an air blower device 602. Prong 9a is connected at one of its ends to an input of vacuum device 604 and prong 9b is connected at one of its ends to an output of the air blower device 602. One or more of devices 602 and 604 may be used to clean out one or more of prongs 9a-9j shown in FIG. 2. The vacuum device 604 may have an input configured to mate and/or connect with either of two ends of the prong 9a or any of the other prongs 9b-9j shown in FIG. 2. The air blower device 602 may have an output configured to mate and/or connect with either of two ends of prong 9b or any of the other prongs 9a or 9c-9j.

Figure 8:
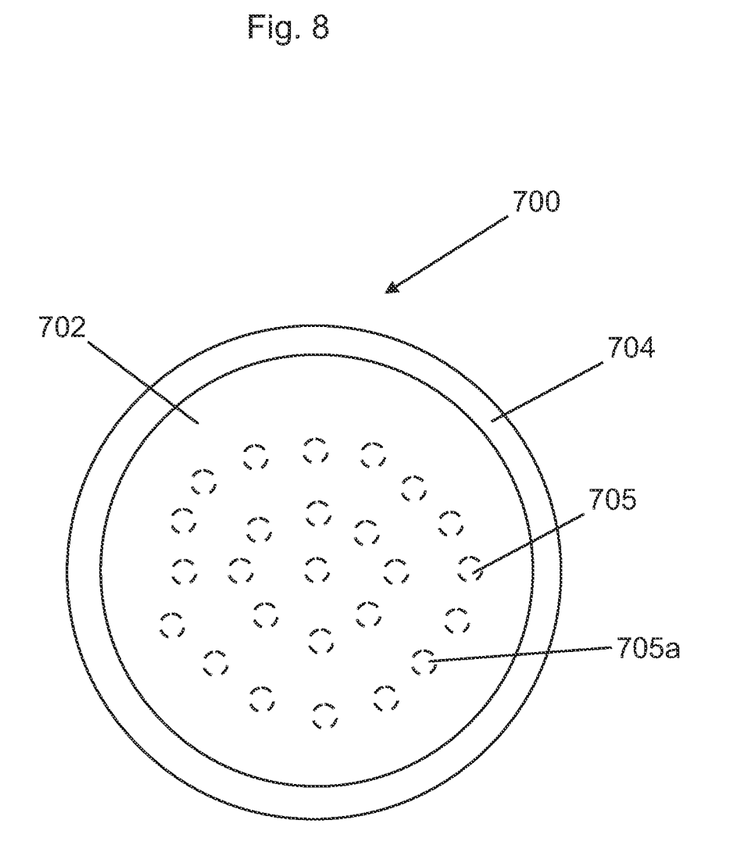
FIG. 8 shows a simplified diagram of a two piece apparatus for holding a meat patty down and using quills or prongs to penetrate the patty to inject seasoning.

FIG. 8 shows a simplified diagram top view of a two piece apparatus 700 for holding a meat patty down and using quills or prongs to penetrate the patty to inject seasoning. The apparatus 700 includes a bottom piece or disk 704, which is aligned underneath a top piece or disk 702 having a plurality of prongs 705, including prong 705a. The disks 702 and 704 may have the same area, size, and shape, and may be aligned or substantially aligned. There typically would be an area between the disks 702 and 704 for inserting a meat patty between the disks 702 and 704, wherein the meat patty would also be substantially aligned with the disks 704 and 704 and of substantially the same area, size, and shape as each of the disks 702 and 704. The prongs 705 are shown in a dashed line form, because they cannot be seen from the top view, unless the top disk 702 is transparent. Each of the prongs 705 points downward perpendicularly, or substantially perpendicularly to the top disk 702 and to the bottom disk 704. Each of the prongs 705 is typically parallel to each other. The disks 702 and 704 are configured to be arranged and/or fixed parallel or substantially parallel to each other. The prongs are elongated similar to prongs 9a-9j shown in simplified form in FIG. 2, and are shown as dots in FIG. 8, for simplification to show location.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising:
   a housing;
   a plurality of prongs connected to the housing so that the prongs are movable with respect to the housing; and
   a device for holding a food; and
   wherein the plurality of prongs are configured to be moved from a position outside of the food to a position where the plurality of prongs are inserted into the food;
   wherein the plurality of prongs are configured to insert a substance into the food; and
   wherein the plurality of prongs are configured to be inserted at an angle to the device for holding the food, while the device for holding the food is in physical contact with the food; and
   wherein each corresponding prong of the plurality of prongs has a corresponding sensor to indicate when each corresponding prong hits bone in the food.

2. The apparatus of claim 1 wherein
   the plurality of prongs are configured to be inserted perpendicularly to the device for holding the food.

3. The apparatus of claim 1 further comprising
   a computer processor; and wherein
   each corresponding sensor of each corresponding prong is configured to communicate with the computer processor to cause each corresponding prong to stop penetrating into the food when each corresponding sensor indicates that each corresponding prong has hit bone in the food, while allowing one or more other prongs of the plurality of prongs, other than each corresponding prong, to continue penetrating into the food, if one or more other prongs do not hit bone in the food.

4. The apparatus of claim 1 further comprising
   a cook food platform;
   a sandwich platform;
   a hot beverage platform; and
   a cold beverage platform.

5. The apparatus of claim 4 wherein
   the cook food platform is connected to a cooking chamber, a refrigerator chamber, a room temperature chamber, a thawing and marinating chamber, and a freezer chamber.

6. The apparatus of claim 4 wherein
   the sandwich platform is connected to a cold cuts chamber, a patties chamber, and a baking chamber.

7. The apparatus of claim 4 wherein
   the hot beverage platform is connected to a cappuccino chamber, a tea bags chamber, an espresso chamber, and a sugar and creamer chamber.

8. The apparatus of claim 4 wherein
   the cold beverage platform is connected to an apple juice tank, a large soda bottles chamber, an orange juice container, and a grape juice container.

9. The apparatus of claim 4 further comprising
   a fence which holds a piece of bread in place while a sandwich is automatically prepared.

10. The apparatus of claim 1 wherein
    there are a plurality of chambers within the housing;
    wherein the plurality of chambers include a refrigerator chamber and a marination chamber, which share one or more insulated walls and which are separated by one or more insulated walls;
    and wherein the device for holding the food and the plurality of prongs are located in the marination chamber.

11. The apparatus of claim 10 wherein
    the plurality of chambers further include a cooking chamber and a room temperature chamber, which share one or more insulated walls and are separated by one or more insulated walls.

12. The apparatus of claim 1 wherein
    the device for holding the food includes a top piece and a bottom piece which are configured to hold the food between the top piece and the bottom piece, while one or more of the plurality of prongs are inserted into the food at an angle to the top piece and the bottom piece.

13. The apparatus of claim 12 wherein
    the top piece is a disk and the bottom piece is a disk.

14. The apparatus of claim 12 wherein
    the plurality of prongs are configured to be inserted substantially perpendicular to the top piece and the bottom piece while the top piece and the bottom piece are holding the food.

15. A method comprising:
    automatically preparing an item for human consumption by using an apparatus comprising
    a cook food platform;
    a sandwich platform;
    a hot beverage platform; and
    a cold beverage platform; and
    wherein the apparatus further includes a housing;
    wherein there are a plurality of chambers within the housing;
    wherein the plurality of chambers include a marination chamber and a refrigerator chamber;
    wherein the apparatus further includes a plurality of prongs connected to the housing so that the prongs are movable with respect to the housing; and
    wherein the apparatus further includes a device for holding a food; and
    wherein the plurality of prongs are configured to be moved from a position outside of the food to a position where the plurality of prongs are inserted into the food; and
    and wherein the plurality of prongs are configured to insert a substance into the food; and
    wherein the plurality of prongs are configured to be inserted at an angle to the device for holding the food, while the device for holding the food is in physical contact with the food; and
    wherein each corresponding prong of the plurality of prongs has a corresponding sensor to indicate when each corresponding prong hits bone in the food.

16. The method of claim 15 wherein
    the item for human consumption is a cooked food.

17. The method of claim 15 wherein
    the item for human consumption is a sandwich.

18. The method of claim 15 wherein
    the item for human consumption is a hot beverage.

19. The method of claim 15 wherein
    the item for human consumption is a cold beverage.

* * * * *